United States Patent [19]

Trego

[11] Patent Number: 4,990,555

[45] Date of Patent: Feb. 5, 1991

[54] PREPARATION OF HYDROXY TERMINATED POLYSILOXANES

[75] Inventor: Brian R. Trego, Dinas Powys, Wales

[73] Assignee: Dow Corning S.A., Senneffe, Belgium

[21] Appl. No.: 467,062

[22] Filed: Jan. 18, 1990

Related U.S. Application Data

[63] Continuation-in-part of Ser. No. 254,018, Oct. 6, 1988, abandoned.

[30] Foreign Application Priority Data

Oct. 24, 1987 [GB] United Kingdom ............... 8724956

[51] Int. Cl.$^5$ ............................................. C08K 3/26
[52] U.S. Cl. ........................................ 524/424; 528/23; 524/357; 524/425
[58] Field of Search .................. 528/23; 524/357, 424, 524/425

[56] References Cited

U.S. PATENT DOCUMENTS

| | | | |
|---|---|---|---|
| 4,368,313 | 1/1983 | Hayes | 524/357 |
| 4,482,670 | 11/1984 | Saam et al. | 528/23 |
| 4,508,887 | 4/1985 | Kohl | 528/21 |
| 4,616,076 | 10/1986 | Ona et al. | 528/23 |
| 4,696,970 | 9/1987 | Sumimura et al. | 528/23 |

FOREIGN PATENT DOCUMENTS

| | | |
|---|---|---|
| 1160642 | 5/1980 | Canada. |
| 899657 | 3/1959 | United Kingdom. |
| 1476834 | 10/1975 | United Kingdom. |
| 1542963 | 4/1976 | United Kingdom. |

*Primary Examiner*—Melvyn I. Marquis
*Assistant Examiner*—Karen A. Hellender
*Attorney, Agent, or Firm*—Edward C. Elliott

[57] ABSTRACT

The specification discloses a method of preparing a polysiloxane by chain extension of a silicon compound having chain terminating units including a silicon-bonded hydroxyl group which comprises bringing about condensation of the silicon-bonded hydroxyl groups at a temperature of less than 50° C. in presence of an acidic condensation catalyst of the formula $RSO_3H$ and water, to an extent of less than 7 moles per mole of acidic condensation catalyst. The silicon compound may comprise a hydroxyl end-blocked polydimethylsiloxane having a viscosity at 25° C. in the range 30 to 100,000 mm$^2$/s, and it may be polymerized to provide an $\alpha,\omega$ dihydroxy polydimethylsiloxane having a viscosity in the range 1,000 mm$^2$/s to 100,000 mm$^2$/s or more. Preferred acidic condensation catalysts are those in which R is an alkyl group having a chain of 6 to 18 carbon atoms or a group $R''C_6H_4$ where R" represents a hydrogen atom or an alkyl group having a chain of 6 to 18 carbon atoms. The preferred catalyst is dodecylbenzenesulphonic acid. A basic material may be added to the reaction mixture to neutralize said catalyst for example calcium carbonate or magnesium carbonate. The reaction mixture may be compounded to provide a curable composition, for example a moisture curable sealant composition comprising a mixture and/or a reaction product of the polysiloxane and a curative, a catalyst and finely divided filler.

11 Claims, No Drawings

PREPARATION OF HYDROXY TERMINATED POLYSILOXANES

This application is a continuation-in-part of Ser. No. 07/254,018 filed 10/06/88 now abandoned.

This invention is concerned with preparation of hydroxy terminated polysiloxanes.

Hydroxy terminated polysiloxanes are well known materials; lower molecular weight materials for example are commonly used as feed stocks or intermediates in the production of polysiloxane products; higher molecular weight materials are commonly used for example as intermediates in production of crosslinked foamed and unfoamed products. These materials are made by the addition of diorganodichlorosilanes to a water/solvent mixture to yield a mixture of low molecular weight hydroxy end-blocked oligomers and cyclic siloxanes in solvent. The mixture may be purified to separate low molecular weight linear $\alpha,\omega$ dihydroxypolydiorganosiloxane oligomers and cyclic polysiloxanes. Linear $\alpha,\omega$ dihydroxy polydiorganosiloxane polymers of desired molecular weight may be manufactured from the low molecular weight linear $\alpha,\omega$ dihydroxy polydiorganosiloxane oligomers (produced as aforesaid or by a process involving ring opening of the cyclic materials referred to) by way of condensation and equilibration in presence of catalyst. Processes generally used for the bulk manufacture of the polymers require energy in the form of heat. Temperatures of 80° to 175° C. are common. The process is generally carried out using sophisticated equipment. The catalyst used for manufacture by way of bulk polymerisation is generally a basic catalyst which can be removed from the reaction mixture. The choice of catalyst influences the manner of the polymerisation, processes using various known acidic and basic catalysts in general involving not only condensation reaction and thus chain extension but also chain scission reaction. Chain scission results in hydroxy terminated polymer chains of lowered molecular weight and it is the practise to continue the polymerisation to a stage such that the product is equilibrated.

It is known to employ certain alkylsulphonic acids as catalysts for preparation of certain polysiloxanes via ring opening or chain scission and equilibration. For example G.B. Patent Specification No. 899 657 discloses preparation of linear polysiloxanes from reaction of certain perfluoro-substituted cyclic trisiloxanes and a siloxane of the general formula R'' (SiR''$_2$O)$_n$SiR''$_3$ in which each R'' is a hydrogen atom, a hydrocarbon group or a halogenated hydrocarbon group in presence of specified fluorinated sulphonic acids. G.B. Patent Specification No. 1 325 654 discloses polymerisation of organocyclosiloxanes in presence of acidic or neutral filler (e.g. finely divided silica) and anhydrous perfluoroalkane sulphonic acids at temperatures below 50° C. G.B. Patent Specification No. 1 542 963 discloses manufacture of equilibrated mixtures of organopolysiloxanes having organosulphonate groups bonded to the silicon. It is also known to employ fluoroalkane sulphonic acids in conjunction with other acids or salts in the preparation of polysiloxanes; see for example G.B. Patent Specification No. 1 476 834 and E.P. Patent Specifications Nos. 19 251 and 133 975. U.S. Pat. No. 4,482,670, issued Nov. 13, 1984 discloses a method of polymerizing an oligomer comprising a polydiorganosiloxane, polydiorganocyclosiloxane, or mixture thereof in the presence of acidic or neutral reinforcing filler using a catalytic amount of sulfuric or sulfonic acid. The reference teaches the desirability of as little water as is practical. U.S. Pat. No. 4,696,970, issued Sept. 29, 1987, teaches a continuous process for producing a silicone polymer-filler mixture by passing siloxane oligomer, filler, and catalyst through a continuous kneader extruder. The catalyst is any which will polymerize the oligomer. Water present is taught to function as an end-stopping agent and so must be carefully regulated. The operating temperature is from 50° to 200° C. Many of the specifications referred to specify prolonged heating of the reaction mixture and/or removing water therefrom.

It is also known to make hydroxy terminated polysiloxanes in presence of an acidic catalyst by emulsion techniques. This process requires certain types of vessels and reaction conditions in order to achieve successful production.

It is an object of the present invention to provide an improved method for preparation of hydroxy terminated siloxane polymers.

We have found that a polysiloxane having chain terminating units including a silicon-bonded hydroxyl group can be prepared easily in a comparatively short time at room temperature by a method which comprises bringing about a condensation reaction between siloxane units having silicon-bonded hydroxyl groups in presence of certain acidic condensation catalysts and water in controlled proportions.

The present invention provides in one of its aspects a method of preparing a polysiloxane by chain extension of a silicon compound having chain terminating units including a silicon-bonded hydroxyl group which method comprises bringing about condensation of the silicon-bonded hydroxyl groups in the absence of filler at a temperature of less than 50° C. in presence of water and in presence of an acidic condensation catalyst of the formula RSO$_3$H in which R represents an alkyl, aryl or alkaryl group which group may be halogenated, the water being present to an extent of less than 7 moles per mole of acidic condensation catalyst.

In a method according to the invention the silicon compound having chain terminating units including a silicon-bonded hydroxyl group is conveniently a polydiorganosiloxane. The polydiorganosiloxane may be linear or branched. It is preferably an $\alpha,\omega$ dihydroxy polydiorganosiloxane of the general formula HO(R'$_2$SiO)$_x$H wherein each R' represents a saturated or unsaturated, substituted or unsubstituted hydrocarbon group for example an alkyl group having up to twelve carbon atoms (e.g. methyl, ethyl, propyl, vinyl or allyl) or an aromatic group (e.g. phenyl) and x is an integer. In preferred materials at least 85% and preferably all of the R' groups are methyl. The integer x may have any convenient value. By a method according to the invention the silicon compounds may be polymerised at temperatures below 50° C. to provide polysiloxanes of desired molecular size, which may be fluids or gums. Among materials susceptible of treatment by a method according to the invention are hydroxyl end-blocked polydimethylsiloxanes having a viscosity at 25° C. in the range 30 to 250 mm$^2$/s for example the oligomers mentioned above, as well as polysiloxanes of considerably greater viscosity, for example, in excess of 100,000 mm$^2$/s.

In a method according to the invention, the acidic condensation catalyst has the formula RSO$_3$H in which R represents an alkyl, aryl, e.g. phenyl or alkaryl, e.g.

dinonyl- or didodecyl-naphthyl group, which may be halogenated. Preferred acids are those having at least partial compatibility or solubility in the silicon compound and are chosen from acids having the said formula. Acids of the said formula include those having an alkyl group having 6 to 18 carbon atoms, for example hexylsulphonic acid and dodecylsulphonic acid and those having a halogenated alkyl group having up to 18 carbon atoms, for example trifluoromethylsulphonic acid. Benzenesulphonic acid may be used, although its effectiveness may be limited due to compatibility considerations. Suitable acids of the said formula having alkaryl groups R are the monoalkyl and dialkyl substituted benzenesulphonic acids. Preferred acidic condensation catalysts are of the formula R″C$_6$H$_4$SO$_3$H where R″ represents a group R as defined above and is preferably an alkyl group having 6 to 18 carbon atoms. A preferred acidic catalyst is dodecylbenzenesulphonic acid, hereinafter referred to as DBSA.

In a method according to the invention the silicon compound may be condensed readily in a mixer in the absence of filler and in the presence of the acidic condensation catalyst and water. The materials may be mixed together in an open or closed mixer at room temperature. The condensation reaction proceeds comparatively quickly without external application of heat and it is possible to use various types of reaction vessels, for example a static, planetary or screw extruder type mixer, in which the reactants are brought together, mixed and reacted. Also, we prefer not to apply heat to the reaction mixture; the reaction at temperatures greater than about 50° C. is accompanied by significant cleavage of polysiloxane chains with consequent production of shorter chained hydroxy-polysiloxane molecules. At temperatures of about 22° C. and in substantial absence of water, the condensation proceeds smoothly in a short time when as little as about 0.1 part by weight of the preferred catalyst are used per 100 parts by weight of the silicon compound. The amount of chain cleavage which occurs appears to be greater when greater proportions of the acidic catalyst are used, but may be minimized by the presence of a controlled amount of water in the system as aforesaid, i.e. less than 7 moles water per mole of acidic condensation catalyst. Water may be present, for example, as a result of introduction of water to the reaction mixture as an impurity with the reactants, as a by-product generated in the mixing chamber during the condensation, or may be added to the reaction mixture in desired quantities. When using the preferred catalyst, we prefer to ensure that less than 2 parts by weight water are present per 100 parts by weight silicon compound. It is necessary to provide greater amounts of the acidic condensation catalyst when greater amounts of water are present e.g. when very low molecular weight silicon compounds are polymerised to very high molecular weight products. Alternatively, water may be removed (e.g. by distillation) from the reaction mixture. However, removal of water is generally not necessary when preparing polysiloxanes having viscosities of the order of 1,000 to 100,000 mm$^2$/s. The water is permitted to be present to an extent of less than 7 moles per mole of the acidic condensation catalyst present and preferably to an extent of less than 5 moles per mole of the acidic condensation catalyst present. When using the preferred catalyst, the ratio by weight of catalyst to water present is maintained in the region of greater than about 2.5:1, more preferably greater than 3.0:1. The proportion of water present in the reaction mixture is preferably less than 1% by weight of the composition in order to enable production of substantially dry product which can be readily worked up for uses where water sensitivity is an important property, or uses which involve application in the absence of water e.g. as a solventless mixture, in order to avoid the operation of removing copious quantities of water from the polysiloxane.

Hydroxyl terminated polysiloxanes produced by a method according to the invention may have a consistency from a liquid to a gum and may be employed for the same purposes as hydroxy terminated polysiloxanes produced by other methods. They are capable of reaction through their silicon-bonded hydroxyl groups and may therefore take part in the usual curing reactions to provide foamed or unfoamed cured products or may be converted to polysiloxanes having other functional groups e.g. by condensation reaction with organic materials which are reactive with the silicon-bonded hydroxyl groups.

In a method according to the invention the ability of the catalyst to promote condensation or other reactions may be terminated when the polymerisation has proceeded to a desired extent by addition to the reaction mixture of a basic material to neutralise said catalyst. The basic material may take any suitable physical form and may be, for example, an organic amine, a metal oxide or a metal carbonate. The salt of the catalyst so produced may be left in the composition or filtered out. When the polysiloxane is prepared for use in production of cured products containing filler it is particularly convenient to employ a finely divided metal carbonate or oxide as the basic material. We prefer to use a finely divided solid, for example magnesium oxide, magnesium carbonate or calcium carbonate. Further, the polymerisation reaction may be limited by bringing about a reaction between silanol groups of the polysiloxane and for example a monofunctional silanol or alcohol. In those cases where the polymerisation is limited by condensation reaction with an alcohol, addition of a primary alcohol HOX (e.g. where X represents an organic group unreactive with silicon-bonded hydroxyl groups) to the polymerising mass is generally sufficient to halt the polymerization due to conversion of the silicon-bonded hydroxyl groups to silicon-bonded groups OX.

By use of a method according to the invention one may condense polysiloxane diols easily using simple apparatus without the need for application of external heat. For example, one may produce polydiorganosiloxanes of desired consistency which are suitable for working up to provide a suitable basis for compositions curable at room or elevated temperatures to provide one or two part curing rubbers. For example, the low viscosity polymers may be condensed at room temperature in less than 40 minutes to a viscosity of the order of about 50,000 mm$^2$/s by agitation in an open or closed mixing chamber to provide polysiloxanes suitable for use in sealant manufacture.

A method according to the invention may also include the further step of compounding the polysiloxane or the reaction mixture, for example, to provide a curable composition using appropriate curatives and catalysts. For the preparation of sealant compositions the polysiloxane conveniently is an α,ω dihydroxypolydimethylsiloxane having a viscosity in the range 1,000 mm$^2$/s to 100,000 mm$^2$/s, preferably 20,000 to 100,000 mm$^2$/s, for example about 60,000 mm$^2$/s. Curatives which may be used are materials capable of reaction with silicon-bonded hydroxyl groups of the polysiloxane to form a mixture and/or a reaction product of the polydiorganosiloxane having silicon-bonded hydroxyl groups with compounds containing groups which are reactive with, or become reactive with, (e.g. under influence of atmospheric moisture) the silicon-bonded hydroxyl groups of the polymer. Suitable curatives which may be used, for example, include the known moisture vapour activated crosslinkers, i.e. those which employ acetoxy, alkoxy, alkoxyalkoxy, amino, aminoxy, amido, acetamido or oxime substituted silanes (as exemplified by trifunctional organosilanes such as methyltriacetoxysilane, methyltrimethoxysilane, methyltris(cyclohexylamino)silane, methyltrihexanoxysilane and methyltris(methylethyl ketoxime) silane together with appropriate catalysts as required e.g. tin salts or titanium compounds. Suitable tin salts include tin salts of carboxylic acids and particularly the stannous salts of the more commonly available carboxylic acids. Examples of suitable materials are dibutyl tin dilaurate, stannous acetate, stannous napthenate, stannous benzoate, stannous sebacate, stannous succinate, stannous octoate, tetraisobutyl titanate and tetraisopropyl titanate.

The curable composition may also include solvents, extenders (for example cyclic or fluid polydiorganosiloxanes), pigments (for example carbon black, titanium dioxide), antioxidants and/or fillers. Fillers which may be used include reinforcing fillers such as high surface area silicas whether untreated or pretreated in known manner, and extending fillers e.g. ground quartz, silicates, diatomaceous earth, asbestos, glass fibre and finely divided metal carbonates and oxides.

There follows a description of example methods and compositions selected to illustrate the invention. All parts are by weight unless otherwise specified.

EXAMPLE 1

100 parts of a trimethylsilyl endblocked polydimethyl siloxane having a viscosity at 25° C. of 70,000 mm$^2$/s was mixed with 2.5 parts DBSA at room temperature. The viscosity fell to 5,000 mm$^2$/s in 15 minutes. When only 1.5 parts of DBSA were mixed with the polysiloxane, the viscosity fell from 70,000 to 20,000 mm$^2$/s in 15 minutes and reached 5,000 mm$^2$/s in 120 minutes. When the said polymer was mixed with DBSA (2.5 or 1.5 parts) and with 0.5 part water (i.e. about 4 and 7 moles water per mole acid), negligible viscosity change occurred in 7 hours at room temperature. From this Example it can be seen that scission of the polydimethylsiloxane chain in presence of the acid catalyst can be controlled by controlling the proportion of water to catalyst present.

EXAMPLE 2

100 parts of an $\alpha,\omega$ dihydroxypolydimethylsiloxane having a viscosity of 60,000 mm$^2$/s at 25° C. were mixed with 2.5 parts DBSA and 0.5 part water. Polymerisation occurred to provide an $\alpha,\omega$ dihydroxypolydimethylsiloxane having a viscosity of 600,000 mm$^2$/s at 25° C. within 60 minutes of mixing. This example shows that silanol condensation is possible in presence of DBSA and water in proportions shown in Example 1 to be ineffective to promote significant chain scission.

EXAMPLE 3

100 parts of hydroxyl end-blocked polydimethylsiloxanes containing less than 5% (Me$_2$SiO)$_y$ cyclics, having a viscosity at 25° C. of 100 mm$^2$/s and having a total hydroxyl content of less than 1%, and about 600 parts per million of water were placed in a planetary mixer. 2.5 parts of DBSA were added. The mixture reacted rapidly at room temperature producing a polymer comprising an $\alpha,\omega$ dihydroxy polydimethylsiloxane having a viscosity of 50,000 mm$^2$/s within 30 minutes. 1 part of allyl alcohol was added to the reaction mixture. Increases in viscosity ceased.

EXAMPLE 4

100 parts of hydroxyl end-blocked polydimethylsiloxanes containing less than 5% (Me$_2$SiO)$_y$ cyclics, having a viscosity at 25° C. of 100 mm$^2$/s and having a total hydroxyl content of less than 1%, and about 600 parts per million of water were placed in a planetary mixer. 2.5 parts of DBSA were added. The mixture reacted rapidly at room temperature producing a polymer comprising an $\alpha,\omega$ dihydroxy polydimethylsiloxane having a viscosity of 50,000 mm$^2$/s within 30 minutes. When the polymer had a viscosity of 50,000 mm$^2$/s, 10 parts of 2.5% stearate coated calcium carbonate having an average particle size of about 0.075 micron was added and mixing continued. Increases in viscosity ceased. 120 parts of the stearate coated calcium carbonate and 30 parts of trimethyl siloxy end-blocked polydimethylsiloxane were added. A mixture of 7 parts of methyl trimethoxy silane, 2.5 parts titanium diisopropyl di-ethylacetoacetate and 0.2 part N-$\beta$-aminoethyl-$\gamma$-aminopropyltrimethoxysilane was added. The mixture thus prepared provided a one-part sealant composition curable in the atmosphere at room temperature to a tack free condition in 30 minutes.

EXAMPLE 5

100 part portions of hydroxyl end-blocked polydimethylsiloxanes containing less than 5% (Me$_2$SiO)$_y$ cyclics, having a viscosity at 25° C. of 87 mm$^2$/s and having a total hydroxyl content of less than 1%, and about 1500, 1000, 500, 200 and 50 parts per million of water respectively were placed in a planetary mixer. 2.5 parts DBSA were added to each. The mixtures reacted at room temperature and the time taken to reach a viscosity of 50,000 mm$^2$/s was found to be 100, 55, 30, 24, 22 minutes respectively. Thus, the time taken to reach 50,000 mm$^2$/s was shorter with smaller proportions of water to catalyst. Polymerisation in each case was terminated by addition of calcium carbonate.

EXAMPLE 6

0.45 parts of DBSA were added to 3000 parts of $\alpha,\omega$ dihydroxypolydimethylsiloxane having a viscosity of about 50,000 mm$^2$/s which had been prepared by a base catalysed polymerisation and which contained less than 50 parts per million by weight of water. The mixture was stirred in a planetary mixer for 24 hours at room temperature. Initially, viscosity of the polysiloxane increased at about 26,000 mm$^2$/s per hour for about 6 hours and then more rapidly. At the end of the 24 hour period the polymer was a gum having a viscosity of about 2,000,000 mm$^2$/s. The product was divided into two portions. To one portion sufficient trimethyl amine was added to neutralise the DBSA. The other portion was washed with water to wash out the DBSA. Each portion was vacuum stripped and yielded a translucent gum.

EXAMPLE 7

Three 100 part portions of α,ω dihydroxypolydimethylsiloxanes having a viscosity of 50,000 mm$^2$/s were used as starting material for polymerisation at room temperature in presence of 2.5 parts DBSA; 0.5, 0.75, 1.0 parts water respectively were added to the portions. The viscosity of the portions increased by 400,000, 120,000 and less than 1,000 mm$^2$/s over initial periods of 30 minutes.

That which is claimed is:

1. A method of preparing a polysiloxane by chain extension of a silicon compound having chain terminating units including a silicon-bonded hydroxyl group, which method comprises bringing about condensation of the silicon-bonded hydroxyl groups in the absence of filler at a temperature of less than 50° C. in presence of water and in presence of an acidic condensation catalyst of the formula RSO$_3$H in which R represents an alkyl, aryl or alkaryl group which group may be halogenated, and water being present to an extent of less than 7 moles per mole of acidic condensation catalyst.

2. A method according to claim 1 wherein the silicon compound comprises a hydroxyl end blocked polydimethylsiloxane having a viscosity at 25° C. in the range 30 to 100,000 mm$^2$/s.

3. A method according to claim 1 wherein the silicon compound is polymerised to provide an α,ω dihydroxy polydimethylsiloxane having a viscosity in the range 1,000 mm$^2$/s to 100,000 mm$^2$/s.

4. A method according to claim 1 wherein the silicon compound is polymerised to provide an α,ω dihydroxy polydimethylsiloxane having a viscosity of about 2,000,000 mm$^2$/s.

5. A method according to claim 1 wherein the group R of the acidic condensation catalyst is an alkyl group having a chain of 6 to 18 carbon atoms or a group R"C$_6$H$_4$ where R" represents a hydrogen atom or an alkyl group having a chain of 6 to 18 carbon atoms.

6. A method according to claim 1 wherein the catalyst comprises dodecylbenzenesulphonic acid.

7. A method according to claim 1 wherein a basic material is added to the reaction mixture to neutralise said catalyst when the polymerization has proceeded to a desired extent.

8. A method according to claim 7 wherein the basic material comprises calcium carbonate or magnesium carbonate.

9. A method according to claim 1 comprising the further step of compounding the reaction mixture to provide a curable composition using appropriate curatives and catalysts.

10. A sealant composition prepared by a method according to claim 9 which is curable in the presence of atmospheric moisture and which includes a curative, a catalyst and finely divided filler.

11. A composition according to claim 10 wherein the curative comprises a trifunctional acetoxy, amino, aminoxy, amido, acetamido or oxime substituted organosilane.

* * * * *